Figure 1:
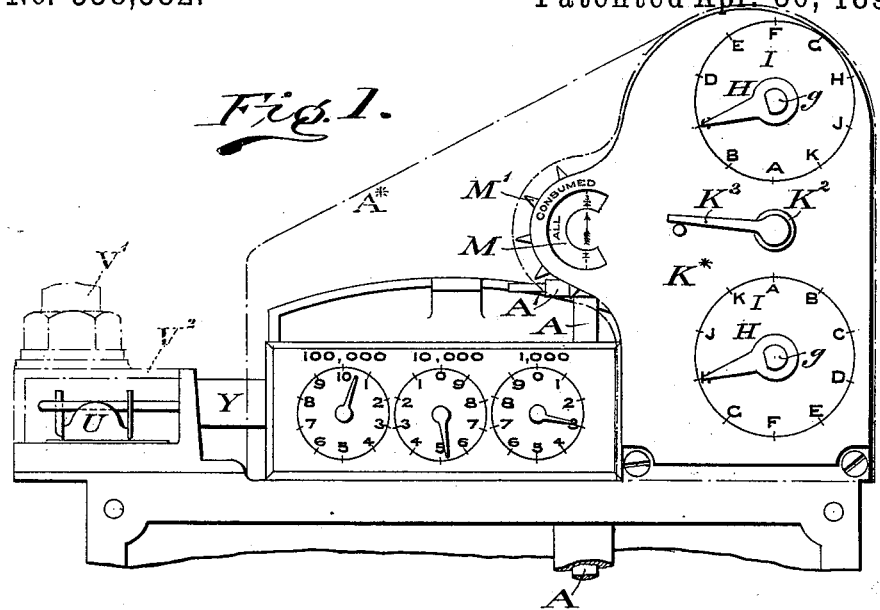

(No Model.) 3 Sheets—Sheet 1.

H. GREEN.
STOP REGISTER APPARATUS FOR GAS OR OTHER METERS.

No. 538,582. Patented Apr. 30, 1895.

Witnesses  
Wm Cross  
Arthur Woodman

Inventor  
Henry Green (No Model.) 3 Sheets—Sheet 2.

H. GREEN.
STOP REGISTER APPARATUS FOR GAS OR OTHER METERS.

No. 538,582. Patented Apr. 30, 1895.

Witnesses. Inventor.

(No Model.)   3 Sheets—Sheet 3.

H. GREEN.
STOP REGISTER APPARATUS FOR GAS OR OTHER METERS.

No. 538,582.   Patented Apr. 30, 1895.

Witnesses.   Inventor.

UNITED STATES PATENT OFFICE.

HENRY GREEN, OF PRESTON, ENGLAND.

STOP-REGISTER APPARATUS FOR GAS OR OTHER METERS.

SPECIFICATION forming part of Letters Patent No. 538,582, dated April 30, 1895.

Application filed March 8, 1894. Serial No. 502,800. (No model.) Patented in England May 14, 1891, No. 8,288, and September 23, 1892, No. 16,998.

*To all whom it may concern:*

Be it known that I, HENRY GREEN, a subject of the Queen of Great Britain and Ireland, residing at Preston, in the county of Lancaster, England, have invented an apparatus applicable to gas or other meters for arresting the same when a determined quantity of gas or other fluid has passed, (for which I have obtained Letters Patent of Great Britain, dated, respectively, May 14, 1891, No. 8,288, and September 23, 1892, No. 16,998,) of which the following is a specification.

This invention has reference to apparatus to be applied to gas or other fluid meters and which can be so set as to arrest the meter to which it is applied after a given quantity of gas or other fluid (hereinafter included in the term gas) previously paid for shall have been passed through the meter.

Apparatus for this purpose according to this invention comprises sets of stops made adjustable in accordance with a pre-arranged key or table, a movable part adapted to travel in a path in which in certain positions of the stops it will be arrested, and means for imparting movement to the said part from the meter while it is working, the arrangement being such that the arrestation of the said movable part by the stops will cause stoppage of the meter which will not again work until adjusted in accordance with the key or table applicable to the stops that caused the said stoppage. The said movable part may advantageously consist of a nut provided with projections and operated by a screw driven through suitable gearing from a moving part of the meter. Conveniently, each set of stops may be a series of annular projections around a cylinder, with parts cut away to allow the projections of the before mentioned nut to pass when the two sets of stops are so relatively situated that one of each set presents a break for the passage of the corresponding projection of the nut. Each set of stops is provided with a finger or pointer, and an index or dial is so arranged in relation to each of these as to enable the two sets of stops to be from time to time readily adjusted in accordance with the aforesaid key or table to allow the supply by the meter of the desired quantity of gas. When the meter is arrested by one pair of stops, it will be necessary for the user of the meter to procure, it may be, at the office of the owners of the gas or other fluid, to be supplied, a card or ticket containing an extract from the said key or table setting forth the point on each of the said dials to which each of the said pointers must be adjusted in order to reset the stops so as to allow another quantity to pass through the meter. In order that the meter shall not be suddenly arrested at the same time as the said movable part, the screw and movable part may be so arranged that when the said movable part is stopped, the screw whereby it was caused to travel, continues to be driven by the meter and operates suitable mechanism whereby the flow of gas to or from the meter is stopped, thus putting the meter out of action. Suitable means are provided for locking the stops when set, and for unlocking them to permit of their being reset, the arrangement being such that when unlocked, the meter is put out of action and when the stops are reset and again locked, the meter will be free to supply a further quantity of gas. Also suitable means are or may be provided to indicate what proportion of a given quantity of gas for which the apparatus has been set, has been consumed or to give an indication before the said quantity of gas or other fluid has been entirely consumed, so that the user of the apparatus can arrange for a further supply.

Figure 2:
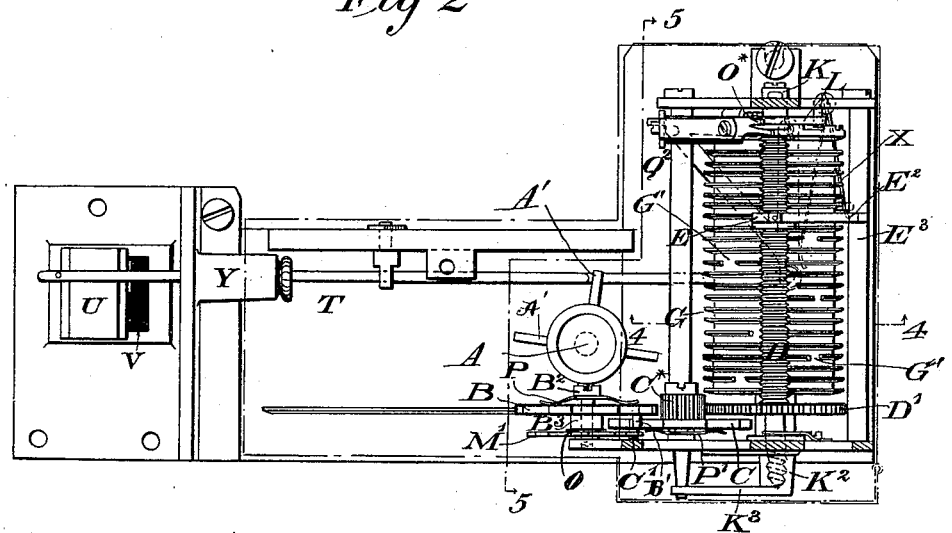
Figure 4:
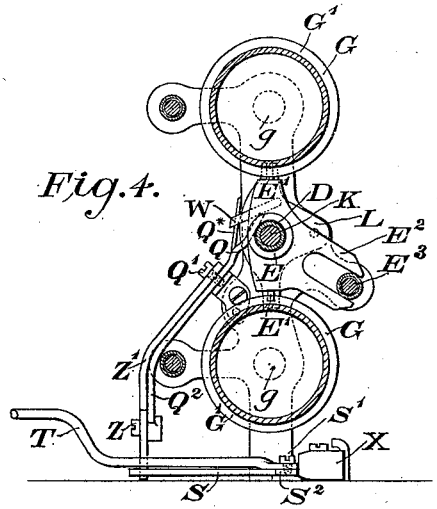
Figure 5:
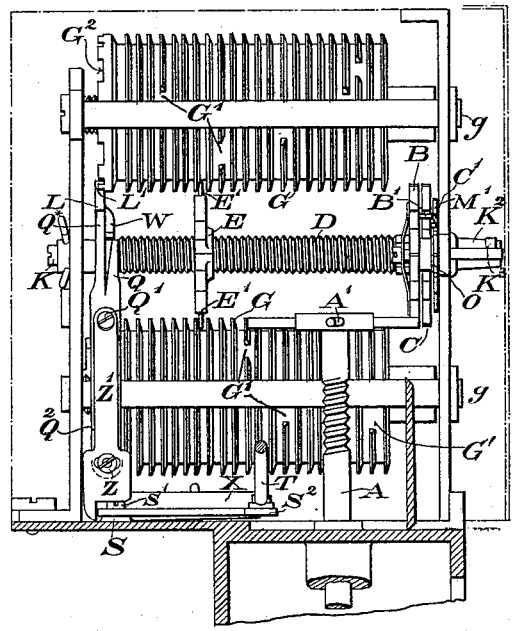
Figure 9:
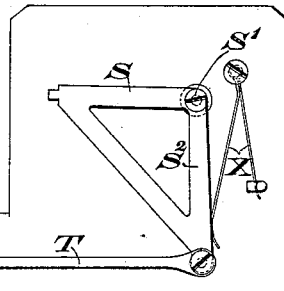
Figure 6:
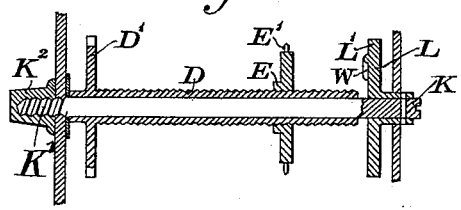
Figure 3:
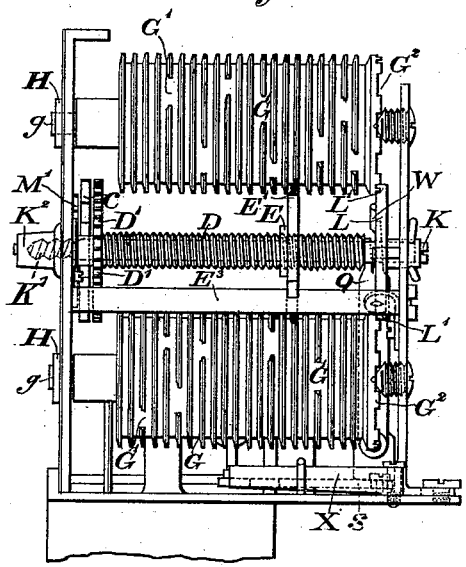
Figure 8:
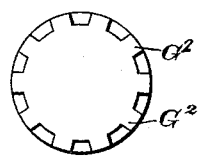
Figure 7:
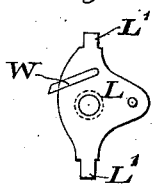

In the accompanying drawings Figures 1, 2, and 3 are respectively a front elevation, a plan, and an end view of the upper portion of a gas-meter fitted with apparatus according to this invention for arresting the said meter when a determined quantity of gas has passed through it. Figs. 4 and 5 are cross-sections on the lines 4 4 and 5 5, respectively, of Fig. 2, looking in the direction of the arrows. Fig. 6 shows the operating-screw and adjacent parts partly in vertical section and partly in elevation. Fig. 7 is an end elevation illustrating a device for locking the stops when set. Fig. 8 is an end elevation of one of the cylinders carrying the stops. Fig. 9 is a plan showing a bell-crank lever and spring by means of which the gas-valve is operated.

A is the spindle of a wet gas meter from which intermittent rotary motion is transmitted through a pin wheel A' and star wheel B having a driving pin B', to a star wheel C carrying a pinion C* that is in gear with a toothed wheel D' fast upon a tubular screw D.

E is a nut fitted upon the screw D and provided with projections E' and with a slotted extension E² embracing a fixed rod E³ that prevents rotation of the nut and thus insures that the nut shall advance on the screw when the latter is rotated, and the former is free to move.

G, G, are sets of annular stops carried by cylinders arranged parallel to the axis of the screw D and formed with breaks or gaps G', one in each stop, to allow the projections E', E' of the nut E to pass.

H, H are fingers or pointers, one on the spindle g of each set of stops.

I, I are dials by the aid of which the stops can be adjusted, through the fingers or pointers H, in accordance with the aforesaid key or table to bring a gap G' opposite each of the projections E' to permit the nut E to travel on the screw D and thereby to allow of the supply by the meter of the desired quantity of gas. Such adjustments can be effected until the whole of the stops are passed.

K is a non-rotating locking rod passing through the tubular shaft D as shown in Fig. 6. This rod is provided at one end with a piece L carrying projections L', shown separately and more clearly in Fig. 7 and having at the other end a screw thread K' on which works a nut K² that can be turned in either direction by an arm K³ attached to it, the said nut being carried by the dial plate K*, which prevents it moving endwise. By this arrangement when the nut is partly turned in one or other direction, it will move the said rod K endwise, thereby throwing the projections L' into or out of engagement, as the case may be, with lateral projections G² at the end of each of the barrels carrying a set of stops G as shown in end view in Figs. 2, 3, 5 and 8.

M is an indicating dial marked with figures or words to indicate various proportions, say ¼, ½, ¾, and all of the total quantity of gas or other fluid for which the apparatus is set. This dial, which can be viewed through a curved slot in the front plate K* and read in connection with an arrow marked on the said front plate as shown in Fig. 1, is carried by a star wheel M' that is intermittently driven by a pin C' on the star wheel C and is mounted to rotate upon the pin B² carrying the star wheel B, this pin being fixed to the front plate K*.

To prevent the motion of the star wheel B being transmitted by friction to the star wheel M', there is interposed between the boss B³ of the star wheel B and the face of the star wheel M' a washer O that is fitted to the pin B² so that it cannot rotate thereon, as for example by forming a flat surface on the portion of the pin carrying the washer and making the hole in the washer to correspond in form to that of the pin in cross section.

P is a bent spring arranged between the star wheel B and the head of the pin B², and P' is a similar spring arranged between the star wheel C and the front plate K*. These springs serve to put a drag on the wheels and prevent them being turned by vibration or shaking.

In proximity to the inner end of the tubular screw D there is arranged one end Q of a lever pivoted at Q'. The other end Q² of this lever is arranged to actuate one arm S of a horizontal bell crank lever pivoted at S' (Fig. 9) and the other arm S² of which is connected by a rod T to a slide valve U which controls a port V through which the gas passes from the gas supply pipe V' and valve box V² to the interior of the meter.

W is a pin fixed to the plate L and arranged to act against a bent extension Q* of the arm Q of the lever Q Q².

X is a spring arranged to act against the bell crank lever S, S² and tending to move the valve into its proper position and to keep the end of the arm Q of the lever Q Q² in contact with the inner end of the screw D.

Y is a stuffing box carried by the gas box V' and through which the rod T works gas tight.

It being premised that the direction of rotation of the screw D during the operation of the meter is such that the nut E is caused to travel away from the lever Q Q², it will be seen that the arrangement is such that so long as the nut E is allowed by the annular stops G to be advanced along the screw, the lever Q Q² will act as a stop to prevent the endwise movement of the screw, and enable the slide valve to be held in a suitable position by the action of the spring X, but that when the nut is arrested by its pins E' coming in contact with the pair of the annular stops G toward which the pins are moved by the action of the screw D on the nut, the stop lever Q Q², under control of the spring X, will permit the screw to travel endwise in an opposite direction to that in which the nut previously moved and in so doing to move the said stop lever to a sufficient extent to actuate the slide valve U through the bell crank lever S S² and rod T and close the gas port V, whereupon the meter will stop and the screw will cease to be driven until the parts have been readjusted.

The arm Q² of the lever Q Q² instead of acting directly against the arm S of the lever S S² may advantageously be connected, as shown in Figs. 4 and 5, by a pin and slot connection Z to a supplementary lever Z' pivoted at Q' and the lower end of which acts against the lever arm S. By this arrangement the position of the slide valve U relatively to the gas port V can be readily adjusted to suit requirement.

When the locking rod K is moved endwise to cause the projections L' of the plate L to move and unlock the two sets of annular stops G, to allow of these stops being reset for a further supply of gas, the pin W, fixed to the said plate L, will, by acting against the extension Q* of the lever Q Q², move the arm Q away from the end of screw D and permit such screw, together with the nut E thereon, to be carried back by reason of the friction between the said screw and the locking rod sufficiently to move the projections E' out of contact with the annular stops G that have last arrested the nut E. This movement of the screw D affords security against fraud, as the removal of the projections E' from the stops G, caused by the slight endwise movement of the screw has the important effect of preventing the proper position of the stops G being found by the sense of touch, and renders it essential to possess the proper key or table in accordance with which the two sets of stops G must necessarily be adjusted before the said projections will be able to pass through a pair of the gaps G'. The movement of the lever Q Q² by the pin W also closes the slide valve U which is held closed so long as the projections L' are free from the lateral projections G² at the end of the stop cylinder (Fig. 8); but, when the fingers H have been set to the proper key or table as aforesaid, and the locking rod K has been brought back into its normal position by means of the arm K³ so as to bring the projections L' into engagement with the projections G², the pin W of the piece L will allow the lever Q Q² and screw D to be returned into their normal positions by the spring X which will also act to again open the valve and permit a further quantity of gas to be supplied.

After the apparatus has been fixed to the meter, the operator can obtain access only to the indexes D and pointers or fingers H, inasmuch as the rest of the apparatus is inclosed by a cover A* so that the operator cannot ascertain by inspection of the internal machinery how to set the pointers or fingers H.

When the projections E' of the nut E have passed the whole set of stops, the apparatus is or may be removed and replaced by another adjustable stop in accordance with a different key or table, or the stops G may be removed and other stops inserted in their place. If the stops only are removed and replaced, the nut E must be put back to its starting position ready to again travel forward between the stops. The apparatus or stops so removed may be transferred and fitted to other meters prepared to receive the same according to my invention.

In the arrangement of apparatus illustrated only two sets of stops G are shown, but I do not confine myself to that number.

As will be evident apparatus according to my invention may be applied to meters of various kinds; also the valve and the mechanism for operating it from the screw D can be constructed in various forms and arranged in various ways.

What I claim is—

1. Apparatus applicable to a gas or other meter for arresting the same when a determined quantity of gas or other fluid has passed, comprising a set of adjustable stops, a movable part adapted to travel in a path in which said stops are adapted successively to arrest it and thereby to cause successive stoppages of the meter, means for adjusting said stops so as to allow said movable part when arrested by one of said stops to move onward to the next of said stops, and means for operating said movable part from the meter when the same is working substantially as herein-described.

2. Apparatus applicable to a gas or other meter for arresting the same when a determined quantity of gas or other fluid has passed, comprising adjustable stops, a screw, a non-rotatable nut arranged to travel on said screw and having its movements limited by said stops, and means for rotating said screw from a movable part of said meter, substantially as herein described for the purpose specified.

3. Apparatus applicable to a gas or other meter for arresting the same when a determined quantity of gas or other fluid has passed, comprising adjustable stops, a screw, a non-rotatable nut arranged to travel on said screw and having its movements limited by said stops, and means for rotating said screw from a movable part of said meter, substantially as herein described for the purpose specified.

4. Apparatus applicable to a gas or other meter for arresting the same when a determined quantity of gas or other fluid has passed, comprising stops made adjustable in accordance with a pre-arranged key or table, a rotary screw normally held in an endwise direction but capable of endwise motion, a non-rotatable nut arranged to travel on said screw and having its movements limited by said stops, means for rotating said screw from said meter, a valve for controlling the flow of gas to or from said meter, and mechanism for operating said valve by longitudinal movement of said screw when said nut is arrested as set forth.

5. In apparatus applicable to a gas or other meter for arresting the same when a determined quantity of gas or other fluid has passed, the combination with sets of annular stops formed with gaps and adapted to be adjusted in accordance with a pre-arranged key or table, a movable part the motion of which is limited by said stops, and mechanism for operating said movable part from the meter, of a locking device for said stops, and means under the control of said locking device whereby stoppage of the meter will be effected when said stops are unlocked as set forth.

6. In apparatus for the purpose herein described, the combination of adjustable stops, a screw, a non-rotatable nut arranged to travel on said screw and having its movement limited by said stops means for rotating said screw from a movable part of said meter, and an endwise adjustable locking rod carrying said screw and provided with parts adapted to normally engage and hold said stops whereby when said locking rod is moved endwise to unlock said stops it will liberate and carry said screw endwise and move the nut away from said stops substantially as herein described for the purpose specified.

7. In apparatus for the purpose herein described, the combination with adjustable stops, a screw and means for rotating the same from a movable part of the meter to which the apparatus is applied of a non-rotatable nut arranged to travel on said screw and having its movements limited by said stops, an endwise adjustable locking rod carrying said screw and provided with parts adapted to normally engage and hold said stops, a valve for controlling the flow of gas or other fluid to and from the meter, a lever arranged to be operated from said screw and from said locking rod when the same are moved endwise and mechanism connecting said lever with said valve substantially as herein described for the purposes specified.

8. In apparatus for the purpose herein described, the combination with a number of stops, a movable part adapted to travel in a path in which said stops are adapted to successively arrest it and thereby to cause successive stoppages of the meter, means for adjusting said stops so as to allow said movable part when arrested by one of said stops to move onward to the next of said stops and mechanism for operating said movable part, of an indicator operated from said mechanism and adapted to indicate the proportion used of the total quantity of gas or other fluid for which the apparatus is set substantially as herein described.

9. In apparatus applicable to a gas or other meter for arresting the same when a determined quantity of gas or other fluid has passed, the combination of adjustable stops, a screw, a star wheel arranged to be driven by the meter, means for transmitting the motion of said star wheel to said screw, a nut arranged to work endwise on said screw but not to rotate thereon, and projections carried by said nut and the movement of which and said nut will be limited by said stops substantially as and for the purposes described.

10. In apparatus applicable to a gas meter for arresting the same when a determined quantity of gas has passed, the combination of the sets of annular stops G formed with gaps G', projections $G^2$ at the end of each set of stops, a screw and means for rotating the same, nut fitting said screw and provided with projections E' arranged to come in contact with said stops, a locking rod carrying said screw, a locking device carried by said locking rod and adapted to be engaged with and disengaged from said sets of stops, means for operating said locking rod, a valve for controlling the supply of gas to said meter, and means substantially as described for closing said valve when either the said screw or the locking rod is moved inward substantially as described for the purpose specified.

In testimony whereof I have signed my name to this specification in the presence of two subscribing witnesses.

HENRY GREEN.

Witnesses:
 WILLIAM CROSS,
 ARTHUR WOOSNAM,
*Both of 46 Lincoln's Inn Fields, London, W. C.*